United States Patent [19]

Münster et al.

[11] 4,265,865
[45] May 5, 1981

[54] PROCESS FOR THE MANUFACTURE OF PHOSPHORUS PENTACHLORIDE

[75] Inventors: Gerhard Münster, Soden am Taunus; Gerhard Riess; Jürgen Russow, both of Frankfurt am Main, all of Fed. Rep. of Germany

[73] Assignee: Hoechst AG., Frankfurt am Main, Fed. Rep. of Germany

[21] Appl. No.: 167,660

[22] Filed: Jul. 11, 1980

[30] Foreign Application Priority Data

Jul. 14, 1979 [DE] Fed. Rep. of Germany ....... 2928599

[51] Int. Cl.$^3$ .............................................. C01B 25/10
[52] U.S. Cl. .................................................. 423/300
[58] Field of Search ......................................... 423/300

[56] References Cited

U.S. PATENT DOCUMENTS

| 1,859,543 | 5/1932 | Urbain | 423/300 |
| 1,888,713 | 11/1932 | Britton et al. | 423/300 |
| 1,914,750 | 6/1933 | Marsh | 423/300 |
| 3,995,013 | 11/1976 | Démarq | 423/300 |

FOREIGN PATENT DOCUMENTS

| 312685 | 2/1930 | United Kingdom | 423/300 |
| 441239 | 5/1975 | U.S.S.R. | 423/300 |

OTHER PUBLICATIONS

Kirk–Othmer, *Encyclopedia of Chemical Technology*, 2nd Edition, vol. 15, p. 307, (1968).

*Primary Examiner*—O. R. Vertiz
*Assistant Examiner*—Wayne A. Langel
*Attorney, Agent, or Firm*—Curtis, Morris & Safford

[57] ABSTRACT

Phosphorus pentachloride is manufactured from chlorine and phosphorus trichloride in the presence of molten phosphorus pentachloride. The process can be carried out such that the reaction product flows out from the reactor continuously as a melt. Reaction pressures of more than 1 bar and temperatures of from 160° to 250° C. are preferred.

3 Claims, No Drawings

PROCESS FOR THE MANUFACTURE OF PHOSPHORUS PENTACHLORIDE

The invention relates to a process for the manufacture of phosphorus pentachloride from phosphorus trichloride and chlorine.

In the industrial manufacture of phosphorus pentachloride, chlorine gas is introduced into liquid phosphorus trichloride whilst stirring (Ullmann, Enzyklopädie der techn. Chemie, 3rd Edition, Vol. 13, page 563 (1962)). Due to the reaction heat, part of the phosphorus trichloride is evaporated, whilst solid phosphorus pentachloride is precipitated from the liquid phase. After complete reaction, phosphorus pentachloride is obtained as fine-grained granules.

In another known process phosphorus trichloride is sprayed onto a layer of phosphorus pentachloride in a tower, chlorine gas is introduced from below in the counter-current direction, and solid phosphorus pentachloride is discharged at the bottom by screws (Kirt-Othmer, Encyclopedia of Chemical Technology, 2nd Edition, Vol. 15, p. 307 (1968)). The discharge can also be performed continuously.

According to DE-OS No. 2,461,905, phosphorus pentachloride is manufactured from phosphorus trichloride with a substoichiometric amount of chlorine, it is separated from the mother liquor and freed from minor traces of phosphorus trichloride by drying or continued chloration.

Most of the known processes have the disadvantage that they can be carried out only discontinuously because the continuous discharge of $PCl_5$, either as granules or as slurry of crystals in $PCl_3$ can lead to obstruction of the discharge means. Part of the phosphorus trichloride always evaporates due to the reaction heat or it remains in the form of a mother liquor enriched with impurities, which in most cases can be reconducted into the process only after a purification operation. Therefore, the yield of a single reaction is not quantitative. Finally, pulverulent $PCl_5$ is formed by the reaction of vaporous $PCl_3$ with chlorine gas, for example, towards the end of the chlorination, which can cause considerable impairments if it is contained in greater amounts in the granulated product.

Therefore, the object was to find a process for the manufacture of phosphorus pentachloride which avoids the disadvantages of the known processes. The present invention refers to a process for the manufacture of phosphorus pentachloride from phosphorus trichloride and chlorine, which comprises reacting the reaction partners in the presence of molten phosphorus pentachloride and discharging the reaction product as a melt from the reactor.

Phosphorus pentachloride only melts at a pressure of at least 1.05 bars and at a temperature of at least 160° C. Therefore, the process is carried out at from 1.05 to 30 bars, preferably at from 1.05 to 10 bars and at temperatures of from 160° to 250° C., preferably of from 160° to 210° C. Higher pressures do not provide any special advantages, whereas higher temperatures favour the dissociation of phosphorus pentachloride. Phosphorus trichloride and chlorine are fed to the reactor in the stoichiometrical ratio. It is not necessary to meter the amount of chlorine exactly, but at a given total pressure in the reactor which must be higher than the sum of the partial pressures of the phosphorus chlorides, chlorine is added in the same amount as is consumed by the reaction. Phosphorus trichloride, for example, is fed into the reactor by a diaphragm pump, through a tube which is immersed into the melt or preferably into the gaseous zone above the melt. Chlorine can be introduced into the melt or also preferably into the gaseous zone in gaseous or liquid state. The reaction heat can be dissipated in known manner by jacket cooling, coil condensers or heat exchangers.

The process can be carried out stepwise or partially or completely continuously. In the stepwise process, phosphorus trichloride and chlorine are fed to the reactor, for example, an enamelled or stainless steel vessel, provided with a stirring device, until an indicated filling level is reached. Then, the liquid phosphorus pentachloride is discharged and granulated in known manner, for example by cooling rolls, cooling conveyors or by spray crystallization. It is preferred, however, to introduce the reactants continuously and to remove and to granulate the reaction product as a melt from time to time or completely continuously.

The phosphorus pentachloride manufactured according to the invention has a purity of more than 99% and contains a maximum of 1% of phosphorus trichloride. The following examples illustrate the invention.

EXAMPLE 1

Into a 1-liter stainless steel stirring autoclave (DIN 17.740; metal no 1 4571) with a jacket for heating or cooling, 2 inlets for $PCl_3$ and chlorine, manometer, thermometer shelf and bottom valve, there were introduced 630 g of phosphorus pentachloride. The pentachloride was heated in the closed autoclave to 180° C. and thus molten by means of hot circulating oil from a thermostat. Subsequently, by the aid of a diaphragm dosage pump about 200 ml/h of phosphorus trichloride were introduced and chlorine from a steel bottle was fed in until a pressure of from 5 to 6 bars being get up. The inner temperature hereby increased because of the reaction heat to from 200°–210° C. The melt of phosphorus pentachloride was let off through the bottom valve at 15 minute intervals into a heated graduated cylindric pressure vessel of 1 liter in which an excess of about 0.5 bar above atmospheric pressure was maintained, so that $PCl_5$ remained liquid. Per hour, an amount of liquid $PCl_5$, corresponding to the amount of introduced $PCl_3$ was removed, i.e. about 300 ml/h $PCl_5$. Hereby the level in the reaction vessel was maintained nearly constant. After 3 hours a total of 588 ml of $PCl_3$ had been introduced and 950 ml of $PCl_5$ removed. After cooling $PCl_5$ was removed from the glass pressure vessel and a sample hereof was analyzed. The sample contained 0.65% by weight of $PCl_3$.

EXAMPLE 2

The same device as in Example 1 was used, the liquid $PCl_5$, however, being discharged into an open 1-liter two-necked glass flask at normal pressure. At the beginning, the empty reaction vessel was heated to 180° C. and the feed rate of phosphorus trichloride was adjusted to 400 ml/h. Subsequently, chlorine was introduced under pressure from the steel bottle. A pressure of 6 to 7 bars was reached in the reaction vessel by slightly heating the chlorine bottle to about 30° to 40° C. The temperature of the circulating oil of the thermostat was now reduced to 160° C. and for 1 h phosphorus trichloride was introduced until the reaction vessel was filled about half with $PCl_5$. At this level, every 30 minutes an amount of $PCl_5$ corresponding to the amount of added PCl$_3$, that means about 400–500 g, was removed into the previously warmed glass flask, where it solidified gradually. The reaction temperature was at 195°–200° C. After 6 hours a total of 2,265 ml of PCl$_3$ had been introduced and 5190 g of PCl$_5$ had been removed, the reaction vessel at the end of the experiment being completely emptied. The yield was 96%. Losses had been caused by evaporating PCl$_5$ when removing the melt under normal pressure. The product contained 0.4% of PCl$_3$.

What is claimed is:

1. Process for the manufacture of phosphorus pentachloride from phosphorus trichloride and chlorine, which comprises reacting the phosphorus trichloride and chlorine in the presence of a melt of phosphorus pentachloride and at a pressure of from 1.05 to 30 bars and a temperature of from 160° C. to 250° C., and removing the reaction product as a melt from the reactor.

2. Process according to claim 1, wherein the phosphorus trichloride and chlorine are introduced continuously into the reactor and the reaction product is removed continuously.

3. Process according to claim 1 or 3, wherein the reaction product is removed into a pressurized recipient.

* * * * *